May 27, 1941.  C. A. SCHWENDEN  2,243,169
ARC DISCHARGE SYSTEM
Filed April 13, 1939  2 Sheets-Sheet 1
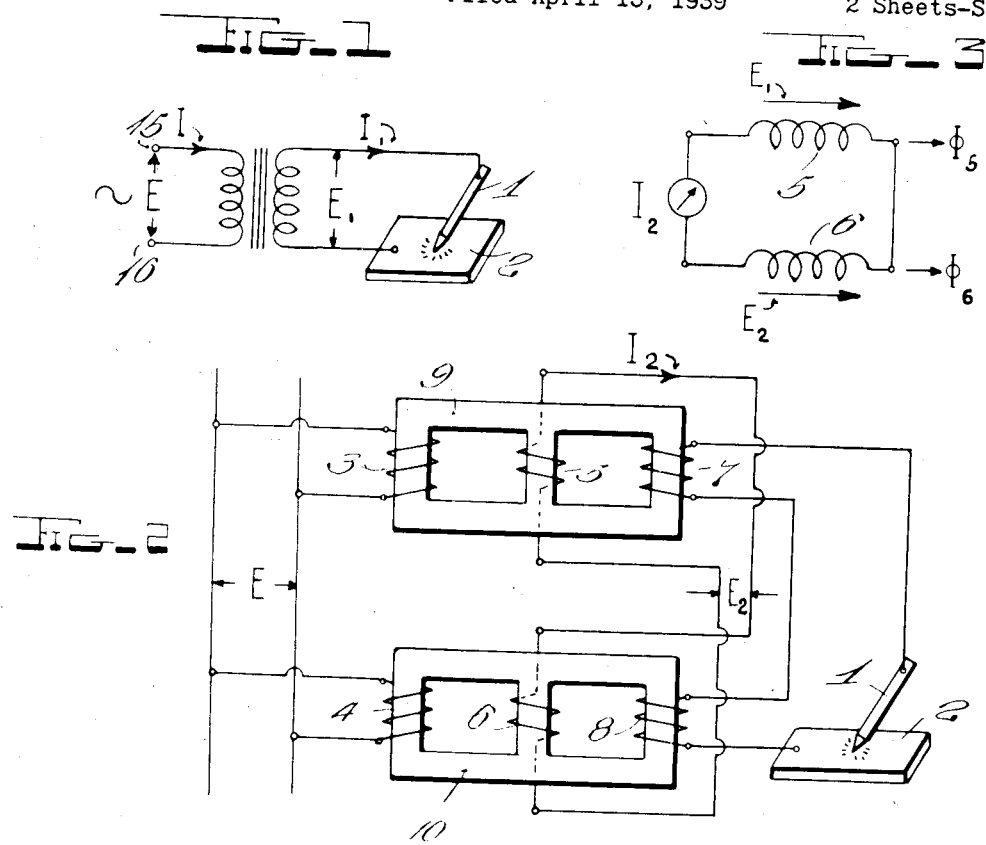
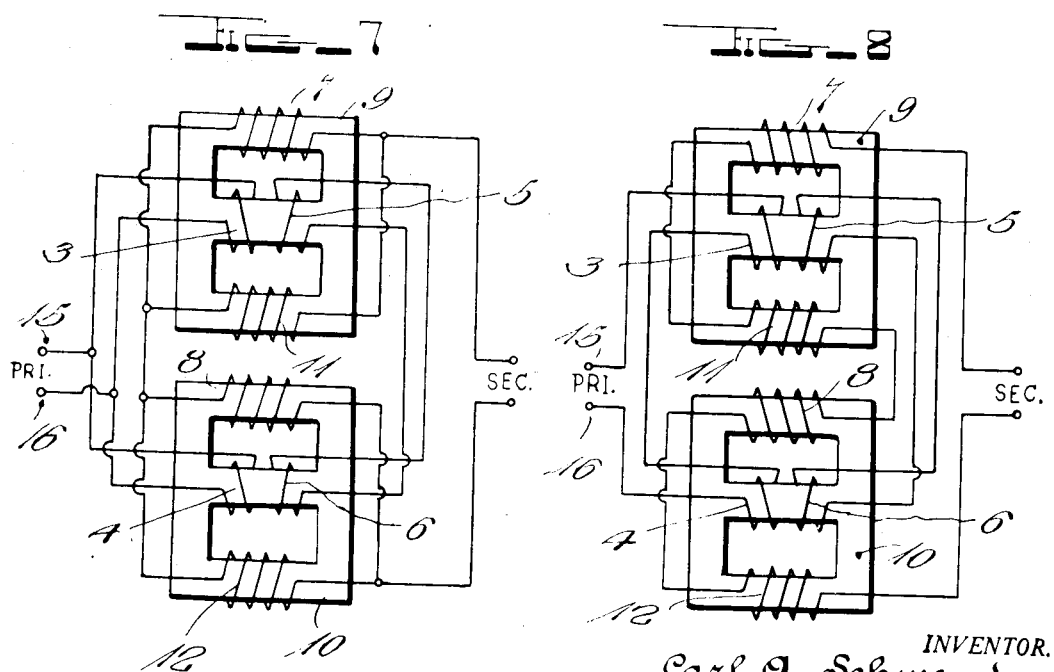
INVENTOR.
Carl A. Schwenden,
BY John C. Brady
ATTORNEY.

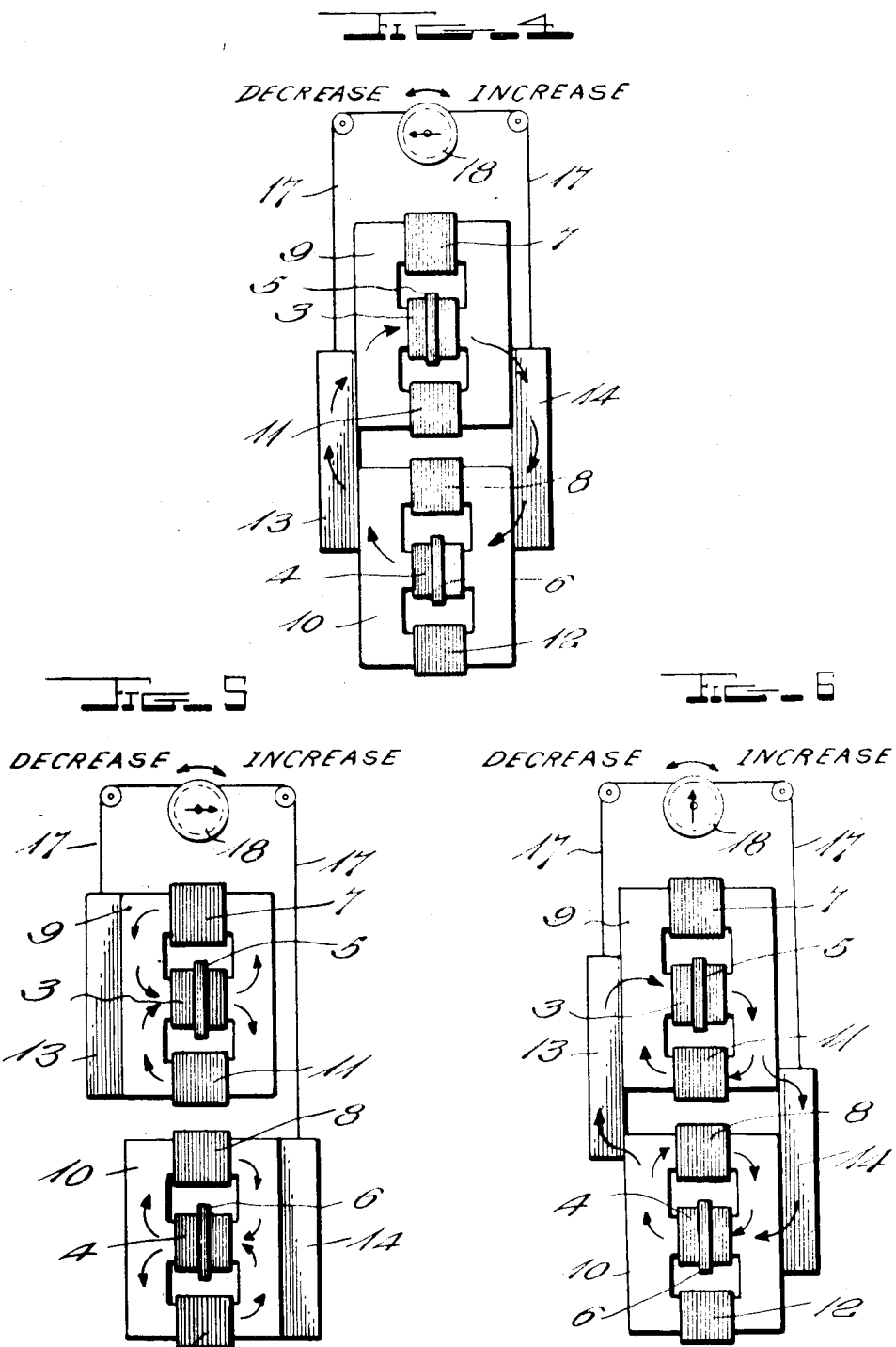

Patented May 27, 1941

2,243,169

UNITED STATES PATENT OFFICE 2,243,169

ARC DISCHARGE SYSTEM

Carl A. Schwenden, Alhambra, Calif., assignor of forty-nine per cent to Harry M. Lindgren, Hollywood, Calif.

Application April 13, 1939, Serial No. 267,702

12 Claims. (Cl. 219—8)

My invention relates broadly to arc discharge systems, and more particularly to apparatus and circuit arrangements for stabilization and uniform control of an arc discharge under varying operational conditions, as in arc welding systems.

One of the objects of my invention is to provide a combination of transformers with secondary and tertiary windings for producing a stable arc discharge across the output terminals.

Another object of my invention is to provide an arrangement of separate electromagnetic devices and adjustable magnetic shunt means therebetween in an arc discharge system, whereby the discharge can be varied uniformly in intensity.

A further object of my invention is to provide novel regulatory and control means in an arc welding system by which it is possible to accomplish commercial arc welding without erratic fluctuations in arc intensity and resulting irregularities in the weld produced.

A still further object of my invention is to provide means for producing more stable and uniform arc discharges for purposes other than arc welding.

Another object is to provide a device which can be readily adjusted for a desired arc intensity and function substantially at such intensity regardless of varying attendant factors, which is of special importance in arc welding.

These and other objects are obtained by a novel relative arrangement of primary, secondary and tertiary coils on two or more separate transformer cores, either by electrical interconnection, magnetic interlinkage of the separate cores, or electrical and magnetic interactions occurring simultaneously, as will be more fully understood from the following description with reference to the accompanying drawings, in which:

Figure 1 illustrates one form of conventional welding system in order to bring out by reference thereto the essential differences between my invention and what is known so far in the art; Fig. 2 is a schematic diagram showing one form of my invention where only electrical interactions cause stabilization of the arc intensity; Fig. 3 is a detailed schematic diagram denoting the instantaneous magnetic polarity of the link coils provided to produce the desired effects in my invention; Fig. 4 shows an arrangement of transformer elements provided with an adjustable magnetic shunt means in accordance with my invention, wherein the shunt means is in such position that minimum power is delivered to the arc electrodes; Fig. 5 illustrates an arrangement as in Fig. 4 wherein the shunt means is in such position that maximum power is transferred to the arc electrodes; Fig. 6 shows an arrangement similar to Figs. 4 and 5, but wherein the shunt means is disposed in an intermediate selected position; and Figs. 7 and 8 are schematic diagrams illustrating different electric circuit arrangements for the transformer elements shown in Figs. 4, 5 and 6.

With respect to Fig. 1 a conventional transformer arrangement for an arc welder is shown, wherein reference characters 15 and 16 denote the input terminals across which a voltage E, say from 220 to 440 volts, is impressed in order to send a current I through the primary winding of the transformer. A corresponding voltage $E_1$ is produced across the secondary winding and may be in the neighborhood of 60 to 80 volts before an arc discharge is produced between the welding rod 1 and the specimen 2 where a weld is to be made. The rod 1 is then moved along the welding seam at a certain distance from the specimen 2 after the arc has been initiated. Due to the nature of the arc discharge and the difficulty in maintaining vision of the work during the welding operation, the correct spacing of the electrode 1 from the specimen is not always maintained, and as a result the arc current $I_1$ will generally fluctuate over wide limits and at times may even be quenched. This may happen just at a portion of the welding seam where a smooth and strong weld is most essential. When quenched, it is necessary that the arc be started again by making active contact of rod 1 and specimen 2 which causes an additional unevenness in the weld.

I have found it advantageous to use two separate transformer cores in the system of my invention, although I do not limit myself to only two cores. The arrangement of Fig. 2 represents one embodiment which I have found to give a smooth welding action even though the hand of the operator is unsteady and other factors tend to cause quenching. In the arrangement of Fig. 2, the quantity E denotes the alternating line voltage which is applied to the primary windings 3 and 4 of separate transformer elements. Coils 3 and 4 are mounted respectively on core structures 9 and 10 which also carry secondary and tertiary windings. The primary coils 3 and 4 of the two transformers could also be connected in series and then connected across the line. Coils 7 and 8 are the respective secondary windings of the two transformers and are shown in series with each other. A parallel connection of coils 7 and 8 can also be used across the welding rod 1 and specimen 2.

Coils 5 and 6 constitute the tertiary windings and are connected in a link circuit in such a way that the voltage $E_2$ is the same whether the connection is as in Figs. 2 and 3, or whether the voltage is only measured across coils 5 without connection to coil 6, or the voltage is only measured across the terminals of coil 6 without any connection to coil 5. This requires that flux $\phi_5$ which causes voltage $E_2$ in coil 5 must be in phase with magnetic flux $\phi_6$ which causes the like voltage $E_2$ in coil 6. The current $L_2$, which may be termed stabilizing current, exists at times when the respective transformers tend to produce unequal load conditions. Many experiments on apparatus of this type have clearly shown that stabilization action due to coils 5 and 6 causes a decidedly better welding arc.

In the system of Fig. 2 the output power delivered to the welding arc can be varied by means of the input voltage E. This can be done by means of a variable resistance in series with the primary of the transformers, a variable choke or by means of both. Such expedients are, of course, not novel. I have found, however, that in combination with the link coils, a magnetic shunt gives by far smoother regulation and operation.

Further experimentation has led to an apparatus as shown in Fig. 4, 5 and 6. Two separate transformers with cores 9 and 10, respectively, as in Fig. 2, are arranged in alignment as shown and magnetic sliding members 13 and 14 are disposed in adjustable shunt relation thereto. The magnetic sliders 13 and 14 are supported by means including wire 17 and pulley 18 provided with a handle by which the sliders may be moved to any position along the two transformers. Fig. 6 shows the sliders in selected relative positions while Figs. 4 and 5 show extreme positions.

In Fig. 4, the magnetic shunting action of members 13 and 14 is such that many lines of force produced by the primary currents in windings 3 and 4 pass through shunts 13 and 14 rather than through the legs around which the secondary turns are wound. For core 9, coils 7 and 11 are the secondary windings and for core 10, coils 8 and 12 are the secondary windings. With the magnetic shunting shown in Fig. 4, only very few lines of magnetic force can produce a voltage in coils 7 and 12, and only a small number of lines of force due to the primary current in coils 3 and 4 can induce voltages in secondaries 8 and 11. The power input for the welding arc will therefore be smallest for such a magnetic shunting. The direction of the arrows in Fig. 4 indicates that the magnetic flux of coil 3 and the magnetic flux of coil 4 have to be directed in the same sense in the shunt circuit; for example, the lines of force may pass from the upper right side of coil 3 to the lower right side of coil 4, through coil 4, leaving coil 4 at the lower left side and passing upward to the upper left side of primary coil 3. The stabilizing tertiary windings 5 and 6 are mounted on the same legs of the respective cores 9 and 10 as the primary windings 3 and 4 and are always subjected to the entire flux produced by the current in the respective primary coils 3 and 4.

With respect to Fig. 5, it will be noted that the magnetic shunt members 13 and 14 are withdrawn from the bridging position of Fig. 4 and have substantially no effect on the flux paths in the separate transformers. Secondary coils 7 and 11, 8 and 12, have induced voltages due to all possible lines of magnetic force caused by the primary currents in coils 3 and 4, respectively. Maximum power is therefore transferred to the welding arc. The link circuit is also simultaneously a means of power factor correction by connecting a suitable static or synchronous condenser to windings 5 and 6, indicated in Fig. 5. That is to say, the circuit including windings 5 and 6, shown in Fig. 5 and which are connected as illustrated in Figs. 2, 7 and 8 may be opened and a static or synchronous condenser inserted in series in this circuit for correcting power factor.

The intermediate position of the shunt members 13 and 14 shown in Fig. 6 is selected to provide a power output between the minimum and maximum obtained in the conditions above considered. The effectiveness of the shunt in such intermediate positions is governed by the reluctance of the magnetic path, or the permeability of the magnetic material of the shunt members and the surface area in contact with the transformer core in proportion to the flux density in the core. Accordingly, the shunt members must be of sufficient dimensions to conduct substantially the entire flux of both transformers, without reaching saturation, if it is desired to obtain the minimum output condition represented in Fig. 4.

It will be understood that shunt members 13 and 14 slide along firm guides, arranged so that tight magnetic shunting exists for any position where the shunt members abut the respective cores, substantially no air gap being permitted therebetween. It is also understood that other mechanical arrangements can be used for changing the degree of magnetic shunting.

In the wiring arrangement of Fig. 7 for the apparatus of Figs. 4–6, the primary coils 3 and 4 are connected in multiple to the power supply at terminals 15, 16. The secondary coils 7 and 11 on the core 9 are also connected in parallel as are secondary coils 8 and 12 on the core 10, and the respective multiple connections of the four secondary coils are connected in series with the welding rod 1 and specimen 2. Any other suitable connections can, of course, be made for which reason I provide, on commercial forms of my devices, a panel board with terminal lugs for the terminals of coils 3, 4, 7, 11, 8 and 12, so that any connection can be readily obtained. For example, in Fig. 8 I have shown primary windings 3 and 4 connected in series across the terminals 15, 16, and all of the secondary windings, 7, 11, 8 and 12, likewise in series so that the voltages are additive.

The link connections of coils 5 and 6 in both Figs. 7 and 8 are the same as described in respect to Figs. 2 and 3, in accordance with my invention; for any other condition the effect of stabilization would not be produced.

The stabilization effected by combination of the link circuit of coils 5 and 6 and the magnetic shunt means not only results in the production of a smooth arc discharge but also provides for gradual adjustment of the arc to proper intensity. Moreover, the link circuit gives the whole arrangement a so-called "lag effect" so that energy changes which would otherwise occur in the arc discharge as sudden phenomena are reduced to delayed variations of relatively small magnitude due to the inertia effect. In cases where the apparatus shown in Figs. 4–6, even though set for maximum power transfer, as in Fig. 5, does not give sufficient output power, additional primary turns may be wound around the legs where secondary coils 7, 11, 8 and 12 are; by such an arrangement I can increase the output as desired.

While I have described my invention in certain preferred embodiments, I desire it understood that modifications may be made, as hereinbefore indicated and otherwise, in the apparatus and circuits of my invention, and that no limitations upon my invention are intended, therefore, except as are imposed by the scope of the appended claims.

What I claim as new and desire to secure by Letters Patent of the United States is as follows:

1. In a power supply system for an arc discharge, parallel feeder circuits each including a transformer having primary and secondary windings, tertiary windings in each transformer interconnected with the voltages thereacross in phase opposition and forming a link circuit for conducting stabilizing current between the transformers in said parallel feeder circuits, the transformers in said feeder circuits being arranged in alignment, and magnetic shunt means disposed in bridging relation to the aligned transformers and adapted to establish a series path for the magnetic flux of the transformers for controlling by the reluctance of said path the distribution of the magnetic flux in said transformers and said magnetic shunt means for regulating the intensity of the arc discharge.

2. In a power supply system for an arc discharge, parallel feeder circuits each including a transformer having primary and secondary windings, and tertiary windings in each transformer interconnected with the voltages thereacross in phase opposition and forming a link circuit for conducting stabilizing current between the transformers in said parallel feeder circuits.

3. In a power supply system for an arc discharge, parallel feeder circuits each including a transformer, the transformers being arranged in alignment, and magnetic shunt means disposed in bridging relation to the aligned transformers and adapted to establish a series path for the magnetic flux of the transformers for controlling by the reluctance of said path the distribution of the magnetic flux between said transformers and said magnetic shunt means for regulating the intensity of the arc discharge.

4. In a power supply system for an arc discharge, parallel transformer feeder circuits including primary and secondary windings, tertiary windings concentric with the primary windings in the field of the magnetic flux from the primary windings, means interconnecting said tertiary windings in a link circuit for stabilizing the operation of said parallel transformer circuits, and magnetic shunt means for coupling said parallel transformer circuits and controlling by the reluctance of said means the distribution of said magnetic flux in the secondary windings for regulating the intensity of the arc discharge.

5. In a power supply system for an arc discharge, parallel feeder circuits each including a transformer having primary, secondary and tertiary windings, a source of power connected in common to said primary windings, means for producing an arc discharge connected in common to said secondary windings, and connections between said tertiary windings for forming a link circuit operative to stabilize said parallel feeder circuits under unequal load conditions in said transformers.

6. In a power supply system for an arc discharge, parallel feeder circuits each including a transformer having primary and secondary windings, a source of power connected in common to said primary windings, means for producing an arc discharge connected in common to said secondary windings, and magnetic shunt means arranged in coupling relation between said transformers and operative to control the distribution of magnetic flux in the secondary windings for regulating the intensity of the arc discharge in the means connected with said secondary windings.

7. An arc welding system comprising a source of power, parallel feeder circuits including separate transformers having primary windings connected with said source, secondary and tertiary windings, arc welding electrodes connected with said secondary windings and supplied thereby with power from said source through said parallel feeder circuits, connections between said tertiary windings on terminals of like instantaneous potential so that no current flows in said tertiary windings under balanced voltage conditions, said tertiary windings and said connections forming a link circuit operative to stabilize said parallel feeder circuits by a circulating current in said link circuit under unequal load conditions in said transformers, and magnetic shunt means arranged in coupling relation between said transformers and operative to control the distribution of magnetic flux between said primary and secondary windings for regulating the intensity of the arc discharge for welding.

8. An arc welding system comprising a source of power, parallel feeder circuits including separate transformers having primary windings connected with said source, secondary and tertiary windings, arc welding electrodes connected with said secondary windings and supplied thereby with power from said source through said parallel feeder circuits, and connections between said tertiary windings on terminals of like instantaneous potential so that no current flows in said tertiary windings under balanced voltage conditions, said tertiary windings and said connections forming a link circuit operative to stabilize said parallel feeder circuits by a circulating current in said link circuit under unequal load conditions in said transformers.

9. An arc welding system comprising a source of power, parallel feeder circuits including separate transformers having primary windings connected with said source, arc welding electrodes connected with secondary windings in said transformers and magnetic shunt means arranged in coupling relation between the transformers and adapted to establish a series path for the magnetic flux of the transformers for controlling by the reluctance by said path, the distribution of the magnetic flux in said transformers between said path and the secondary windings for regulating the intensity of the arc discharge for welding.

10. In a power system for an arc discharge, a pair of transformers connected in parallel feeder circuits, each transformer comprising a rectangular closed core having a primary winding on one leg and a secondary winding on another leg thereof, said cores being arranged in spaced relation with the axes of said windings substantially parallel and the side edges of said cores in alignment, magnetic bar members arranged in sliding relation to the aligned side edges of said cores and adapted to provide a series path for the flux of both said primary windings in proportion to the conductance of said magnetic bar members, and means for adjusting the position of said bar members for controlling the effective conductance thereof and the resulting distribution of magnetic flux between said members and the secondary windings for regulating the intensity of said arc discharge.

11. In a power supply system for an arc discharge, parallel feeder circuits each including an inductance device, an electrical link circuit coupled with said parallel feeder circuits and having a circulating current produced therein under unequal load conditions in the respective inductance devices for stabilizing said parallel feeder circuits, and a magnetic link circuit connected with said inductance devices and operative to control by the reluctance of said magnetic link circuit the operation of said inductance devices and the intensity of the arc discharge.

12. The combination set forth in claim 11 and including physically displaceable magnetic means for varying the reluctance of said magnetic link circuit for adjusting the intensity of the arc discharge.

CARL A. SCHWENDEN.